(12) United States Patent
Omiya et al.

(10) Patent No.: US 12,335,020 B2
(45) Date of Patent: Jun. 17, 2025

(54) RADIO COMMUNICATION APPARATUS, AND RADIO COMMUNICATION METHOD

(71) Applicant: NIPPON TELEGRAPH AND TELEPHONE CORPORATION, Tokyo (JP)

(72) Inventors: Riku Omiya, Musashino (JP); Tomoki Murakami, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 667 days.

(21) Appl. No.: 17/625,873

(22) PCT Filed: Aug. 23, 2019

(86) PCT No.: PCT/JP2019/033136
§ 371 (c)(1),
(2) Date: Jul. 8, 2022

(87) PCT Pub. No.: WO2021/038645
PCT Pub. Date: Mar. 4, 2021

(65) Prior Publication Data
US 2022/0360318 A1 Nov. 10, 2022

(51) Int. Cl.
*H04W 16/26* (2009.01)
*H04B 7/155* (2006.01)
*H04W 16/28* (2009.01)

(52) U.S. Cl.
CPC ........ *H04B 7/15542* (2013.01); *H04W 16/26* (2013.01); *H04W 16/28* (2013.01)

(58) Field of Classification Search
CPC .......... H04B 7/15542; H04B 7/15507; H04W 16/26; H04W 16/28; Y02D 30/70
See application file for complete search history.

(56) References Cited

U.S. PATENT DOCUMENTS

2006/0285505 A1 12/2006 Cho et al.
2008/0009243 A1* 1/2008 Hart ..................... H04W 52/46
455/500
(Continued)

FOREIGN PATENT DOCUMENTS

JP 2006-352894 A 12/2006
JP 2008-066861 A 3/2008
(Continued)

OTHER PUBLICATIONS

G. J. Foschini, "Layered space time architecture for wireless communication in a fading environment when using multiple antennas," Bell Labs Syst. Tech. J., vol. 1, pp. 41-59, Autumn 1996. (Oct. 1996).

*Primary Examiner* — Kibrom T Hailu
(74) *Attorney, Agent, or Firm* — Harness, Dickey & Pierce, P.L.C.

(57) ABSTRACT

A wireless communication system including, a primary transmitting station and a primary receiving station which are being in communication, a secondary transmitting station and one or more secondary receiving stations which use the identical frequency that are used in the above wireless environment, the one or more secondary receiving stations including a secondary receiving station serving as a destination, the secondary receiving station serving as the destination receiving a transmitted signal from the secondary transmitting station, the wireless communication system including a plurality of relay stations located between the secondary transmitting station and the one or more secondary receiving stations, wherein the secondary transmitting (Continued)

station includes a relay station selection unit configured to select at least one relay station that relays the transmitted signal from among the plurality of relay stations, add information for turning on the at least one selected relay station to the transmitted signal, and transmit the transmitted signal, the at least one selected relay station is configured to be turned on in accordance with the information of the transmitted signal to perform a non-regenerative relay of the transmitted signal, and the secondary receiving station serving as the destination is configured to receive the transmitted signal relayed via the at least one relay station that is turned on.

6 Claims, 3 Drawing Sheets

(56) References Cited

U.S. PATENT DOCUMENTS

| | | | | |
|---|---|---|---|---|
| 2010/0261425 | A1* | 10/2010 | Almgren | H04B 7/15535 |
| | | | | 455/7 |
| 2011/0305189 | A1* | 12/2011 | Chen | H04B 7/15592 |
| | | | | 455/7 |
| 2013/0109297 | A1 | 5/2013 | Nagata et al. | |
| 2017/0359766 | A1* | 12/2017 | Agiwal | H04L 5/0048 |

FOREIGN PATENT DOCUMENTS

| | | |
|---|---|---|
| JP | 2010-226569 A | 10/2010 |
| WO | WO-2011/162143 A1 | 12/2011 |

* cited by examiner

RADIO COMMUNICATION APPARATUS, AND RADIO COMMUNICATION METHOD

CROSS-REFERENCE TO RELATED APPLICATIONS

This application is a 371 U.S. National Phase of International Application No. PCT/JP2019/033136 filed on Aug. 23, 2019. The entire disclosure of the above application is incorporated herein by reference.

TECHNICAL FIELD

The present invention relates to a wireless communication system and a wireless communication method by which a transmitting station transmits to a receiving station serving as a destination via one or more relay stations.

BACKGROUND ART

In recent years, due to rapid popularization of wireless terminals, the amount of traffic on wireless networks has increased. To accommodate a large amount of wireless traffic, multi-input-multi-output (MIMO) techniques have been practically used in which transmitting stations and receiving stations use multiple antennas to improve communication capacity and communication quality. Examples of the MIMO techniques include (1) techniques for simultaneously transmitting multiple signals by spatial division multiplexing (SDM) to improve communication capacity, and (2) techniques for improving communication quality by diversity effects and beamforming using different propagation characteristics in multiple paths (Non Patent Literature (NPL) 1).

CITATION LIST

Non Patent Literature

NPL 1: G. J. Foschini, "Layered space time architecture for wireless communication in a fading environment when using multiple antennas," Bell Labs Syst. Tech. J., vol. 1, pp. 41-59, Autumn 1996.

SUMMARY OF THE INVENTION

Technical Problem

In MIMO techniques, as described at above (2), by performing optimal beam (directivity) control corresponding to each MIMO channel, improvement in communication quality of the receiving station serving as the destination is expected.

On the other hand, in a case where there are other systems that use identical frequencies to those of the transmitting station and the receiving station, and there is an interfered station that is subject to interference by a transmitted signal from the transmitting station, the MIMO techniques are also effective for control for avoiding the interference to the interfered station that is subject to interference at the time of transmission from the transmitting station to the receiving station serving as the destination.

However, using the MIMO techniques requires to estimate states of MIMO channels in both the transmitting station and the receiving station, prior to transmission of a packet.

An object of the present invention is to provide a wireless communication system and a wireless communication method that are capable of improving communication quality between a transmitting station and a receiving station that have no MIMO function.

Means for Solving the Problem

A first invention is a wireless communication system including, in a wireless environment where a primary transmitting station and a primary receiving station are in communication, a secondary transmitting station that uses an identical frequency and one or more secondary receiving stations, the one or more secondary receiving stations including a secondary receiving station serving as a destination, the secondary receiving station serving as the destination receiving a transmitted signal from the secondary transmitting station, the wireless communication system including a plurality of relay stations located between the secondary transmitting station and the one or more secondary receiving stations, wherein the secondary transmitting station includes a relay station selection unit configured to select at least one relay station that relays the transmitted signal from among the plurality of relay stations, add information for turning on the at least one selected relay station to the transmitted signal, and transmit the transmitted signal, the at least one selected relay station is configured to be turned on in accordance with the information of the transmitted signal to perform a non-regenerative relay of the transmitted signal, and the secondary receiving station serving as the destination is configured to receive the transmitted signal relayed via the at least one relay station that is turned on.

In the wireless communication system of the first invention, the relay station selection unit of the secondary transmitting station is configured to select a combination of at least one of the plurality of relay stations in which a signal strength of the transmitted signal from the secondary transmitting station is a maximum value or is equal to or larger than a predetermined value at the secondary receiving station serving as the destination.

In the wireless communication system of the first invention, the relay station selection unit of the secondary transmitting station is configured to select, from among combinations of at least one of the plurality of relay stations in which a signal strength of the transmitted signal from the secondary transmitting station is smaller than a predetermined value at the primary receiving station, a combination of at least one of the plurality of relay stations in which a signal strength of the transmitted signal from the secondary transmitting station is a maximum value or is equal to or larger than a predetermined value at the secondary receiving station serving as the destination.

A second invention is a wireless communication method in which, in a wireless environment where a primary transmitting station and a primary receiving station are in communication, a secondary transmitting station that uses an identical frequency and one or more secondary receiving stations exist, and a secondary receiving station of the one or more secondary English Translation of receiving stations that serves as a destination receives a transmitted signal from the secondary transmitting station, wherein a plurality of relay stations are located between the secondary transmitting station and the one or more secondary receiving stations, and the wireless communication method includes performing, by the secondary transmitting station, relay station selection processing of selecting at least one relay station that relays the transmitted signal from among the plurality of relay stations, adding information for turning on the at least one selected relay station to the transmitted signal, and transmitting the transmitted signal, turning on the at least one selected relay station in accordance with the information of the transmitted signal to perform a non-regenerative relay of the transmitted signal, and receiving, by the secondary receiving station serving as the destination, the transmitted signal relayed via the at least one relay station that is turned on.

In the wireless communication method of the second invention, in the relay station selection processing of the secondary transmitting station, the secondary transmitting station selects a combination of at least one of the plurality of relay stations in which a signal strength of the transmitted signal from the secondary transmitting station is a maximum value or is equal to or larger than a predetermined value at the secondary receiving station serving as the destination.

In the wireless communication method of the second invention, in the relay station selection processing of the secondary transmitting station, the secondary transmitting station selects, from among combinations of at least one of the plurality of relay stations in which a signal strength of the transmitted signal from the secondary transmitting station is smaller than a predetermined value at the primary receiving station, a combination of at least one of the plurality of relay stations in which a signal strength of the transmitted signal from the secondary transmitting station is a maximum value or is equal to or larger than a predetermined value at the secondary receiving station serving as the destination.

Effects of the Invention

The present invention may achieve a good signal strength at the secondary receiving station serving as the destination and minimize interference to the primary receiving station as a result of the relay station selection.

DESCRIPTION OF EMBODIMENTS

Figure 1:
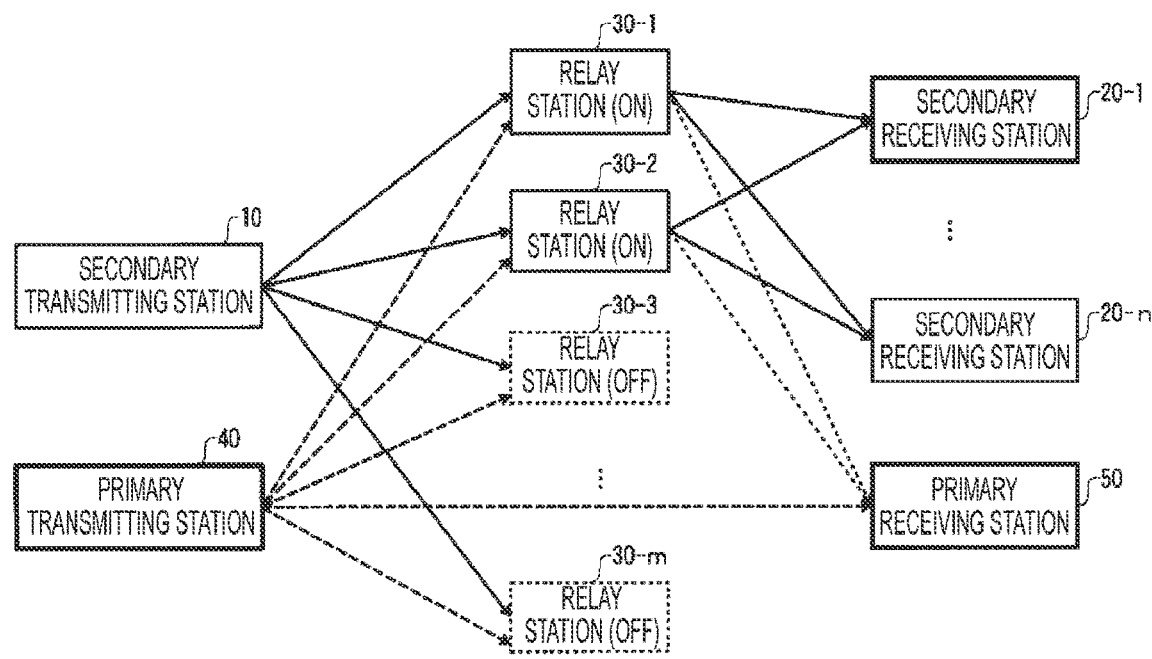
FIG. 1 is a diagram illustrating a configuration example of a wireless communication system according to the present invention.

FIG. 1 illustrates a configuration example of a wireless communication system according to the present invention.

In FIG. 1, in a wireless environment where an existing primary transmitting station 40 and an existing primary receiving station 50 are in communication, there are secondary receiving stations 20-1 to 20-n (n is an integer equal to or larger than 1) that attempt to communicate with the secondary transmitting station 10 that uses an identical frequency. In unicast communication or multicast communication, the secondary receiving station specified by a destination address in a transmitted signal receives the signal. At this time, interference caused by the transmitted signal from the secondary transmitting station 10 needs to be minimized at the primary receiving station 50.

Here, a configuration is applied in which a plurality of relay stations 30-1 to 30-m are located between the secondary transmitting station 10 and the secondary receiving stations 20-1 to 20-n, and the transmitted signal is relayed via one or more relay stations that the secondary transmitting station 10 selects according to the receiving station serving as the destination. Each relay station 30 has a function of turning relay processing on/off according to the selection by the secondary transmitting station 10, and a non-regenerative relay function of relaying and transmitting the transmitted signal from the secondary transmitting station 10 as it is when the relay processing is turned on. Note that, regardless of on/off state, the relay stations 30 do not perform relay processing of a transmitted signal from the primary transmitting station 40.

One of the features of the present invention is that signal strengths of the transmitted signal from the secondary transmitting station 10 are different at the secondary receiving stations 20-1 to 20-n and the primary receiving station 50 according to a combination of one or more relay stations selected by the secondary transmitting station 10, and thus, the combination of the one or more relay stations is selected according to the following applications.

(1) Select a combination of one or more relay stations so that the signal strength of the secondary receiving station serving as the destination (for example, 20-1) is a maximum value or is equal to or larger than a predetermined value.

(2) Select a combination of one or more relay stations so that the signal strength of the secondary receiving station serving as the destination (for example, 20-1) is a maximum value or is equal to or larger than a predetermined value, and the signal strength of the primary receiving station 50 is a minimum value or is smaller than a predetermined value. Note that the combination may be a combination of one or more relay stations in which the signal strength of the secondary receiving station serving as the destination (for example, 20-1) is the maximum value or is equal to or larger than the predetermined value among combinations of one or more relay stations in which the signal strength of the primary receiving station 50 is smaller than the predetermined value.

In order to select the relay stations 30-1 to 30-m corresponding to the above applications, the secondary transmitting station 10 needs to acquire the signal strengths at the secondary receiving stations 20-1 to 20-n and the primary receiving station 50 for each English Translation of combination of the one or more relay stations to be turned on. Here, according to the number of relay stations m, the number of the combinations of the one or more relay stations to be turned on is $2^m-1$. The signal strengths at the secondary receiving station 20-1 to 20-n and the primary receiving station 50 are measured for each combination of the one or more relay stations to be turned on, and are fed back to the secondary transmitting station 10 via the one or more relay stations to be turned on. Based on this information, the secondary transmitting station 10 selects a combination of the one or more relay stations to be turned on according to the applications of (1) and (2) above, and generates and transmits the transmitted signal whose header is added with information for turning on the one or more relay stations. The relay stations 30-1 to 30-m check the header of the transmitted signal transmitted by the secondary transmitting station 10, and only the one or more relay stations to be turned on relay and transmit the transmitted signal.

For example, for the application of (2) described above, FIG. 1 illustrates a state where, when the secondary receiving station 20-1 serves as a destination, the relay stations 30-1 and 30-2 are selected as a combination of the one or more relay stations to be turned on in which the signal strength of the secondary receiving station 20-1 is a maximum value or is equal to or larger than a predetermined value, and the signal strength of the primary receiving station 50 is smaller than a predetermined value. The transmitted signal from the secondary transmitting station 10 is relayed by the relay stations 30-1 and 30-2, and is received by the secondary receiving stations 20-1 to 20-$n$ and the primary receiving station 50. Note that signal paths where the transmitted signal directly reaches the secondary receiving stations 20-1 to 20-$n$ and the primary receiving station 50 from the secondary transmitting station 10 are omitted for the sake of brevity. Furthermore, signal paths where the transmitted signal directly reaches the secondary receiving stations 20-1 to 20-$n$ from the primary transmitting station 40 are omitted for the sake of brevity. Due to selection of the relay stations 30-1 and 30-2, good communication quality may be achieved at the secondary receiving station 20-1 serving as the destination and interference to the primary receiving station 50 may be minimized.

Note that, in the above description, the signal strengths at the secondary receiving stations 20-1 to 20-$n$ and the primary receiving station 50 are measured for each combination of the one or more relay stations to be turned on and are fed back to the secondary transmitting station 10. However, other methods are also applicable. For example, control signals may be bidirectionally transmitted between the secondary transmitting station 10 and the secondary receiving stations 20-1 to 20-$n$ and between the secondary transmitting station 10 and the primary receiving station 50 via the relay stations 30-1 to 30-$m$, and the secondary transmitting station 10 may analyze channel information (phases and strengths) related to the control signals at the relay stations 30-1 to 30-$m$, thereby the distribution of the signal strengths at the secondary receiving stations 20-1 to 20-$n$ and the primary receiving station 50 for each combination of the one or more relay stations may be calculated. The latter method is applicable even in a case where the function of returning the signal strength from the primary receiving station 50 may not be expected.

Figure 2:
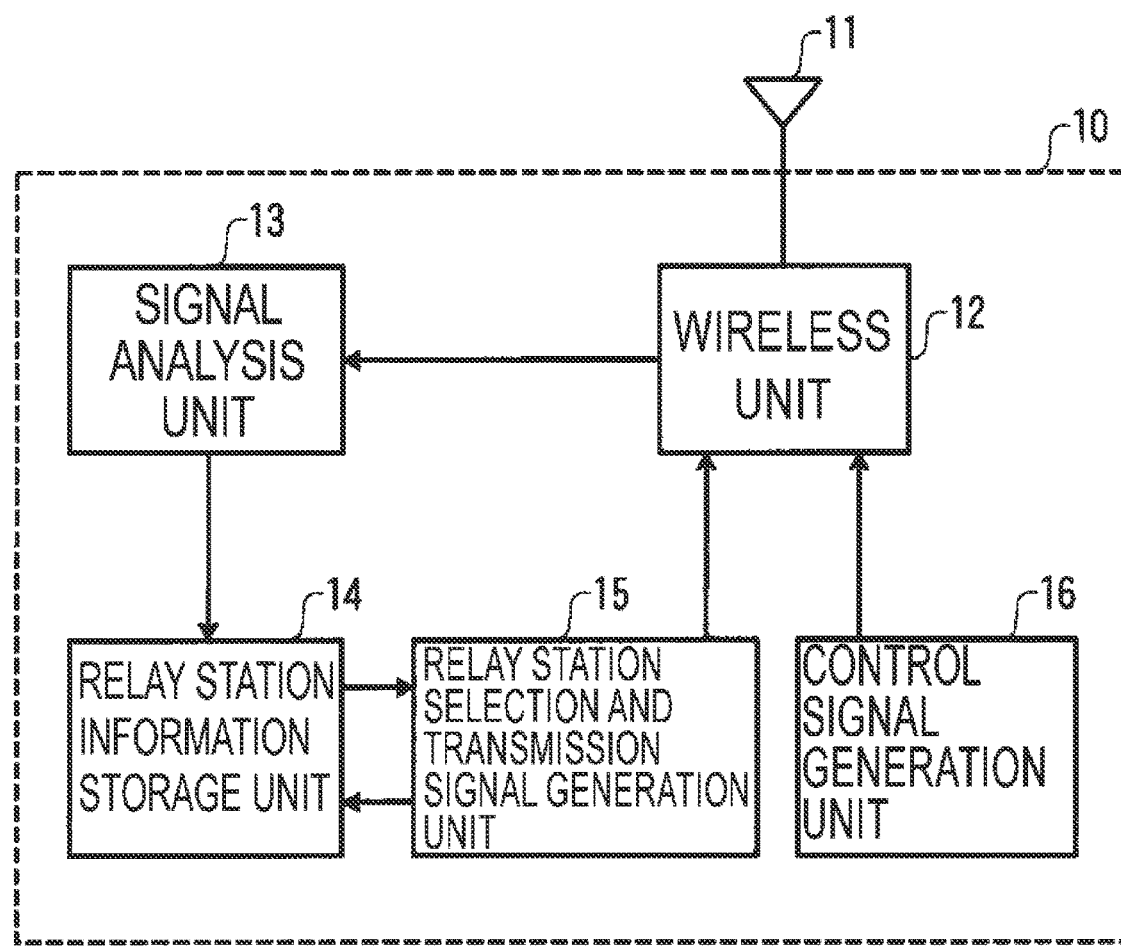
FIG. 2 is a diagram illustrating a configuration example of a secondary transmitting station 10 of the wireless communication system according to the present invention.

FIG. 2 illustrates a configuration example of the secondary transmitting station 10 of the wireless communication system according to the present invention.

In FIG. 2, the secondary transmitting station 10 includes an antenna 11, a wireless unit 12, a signal analysis unit 13, a relay station information storage unit 14, a relay station selection and transmission signal generation unit 15, and a control signal generation unit 16. Note that only blocks related to the present invention are described here, and blocks that are commonly used are omitted.

The control signal generation unit 16 generates control signals that cause the one or more relay stations to be turned on/off and that cause the signal strengths measured at the secondary receiving stations 20-1 to 20-$n$ and the primary receiving station 50 to be fed back to the secondary transmitting station 10 for each combination of the one or more relay stations to be turned on, and transmits the generated control signals from the wireless unit 12 and the antenna 11. Alternatively, the control signals may be signals for collecting channel information between each of the relay stations 30-1 to 30-$m$ and the secondary receiving stations 20-1 to 20-$n$ and between each of the relay stations 30-1 to 30-$m$ and the primary receiving station 50.

The signal analysis unit 13 analyzes the information obtained by the control signal, and stores the information of the signal strengths at the secondary receiving stations 20-1 to 20-$n$ and the primary receiving station 50 in the relay station information storage unit 14 for each combination of the one or more relay stations to be turned on. The relay station selection and transmission signal generation unit 15 selects a combination of the one or more relay stations to be turned on based on the information in the relay station information storage unit 14 according to the receiving station serving as the destination, generates a transmission signal whose header is added with information for turning on the one or more relay stations, and transmits the generated transmission signal from the wireless unit 12 and the antenna 11.

Figure 3:
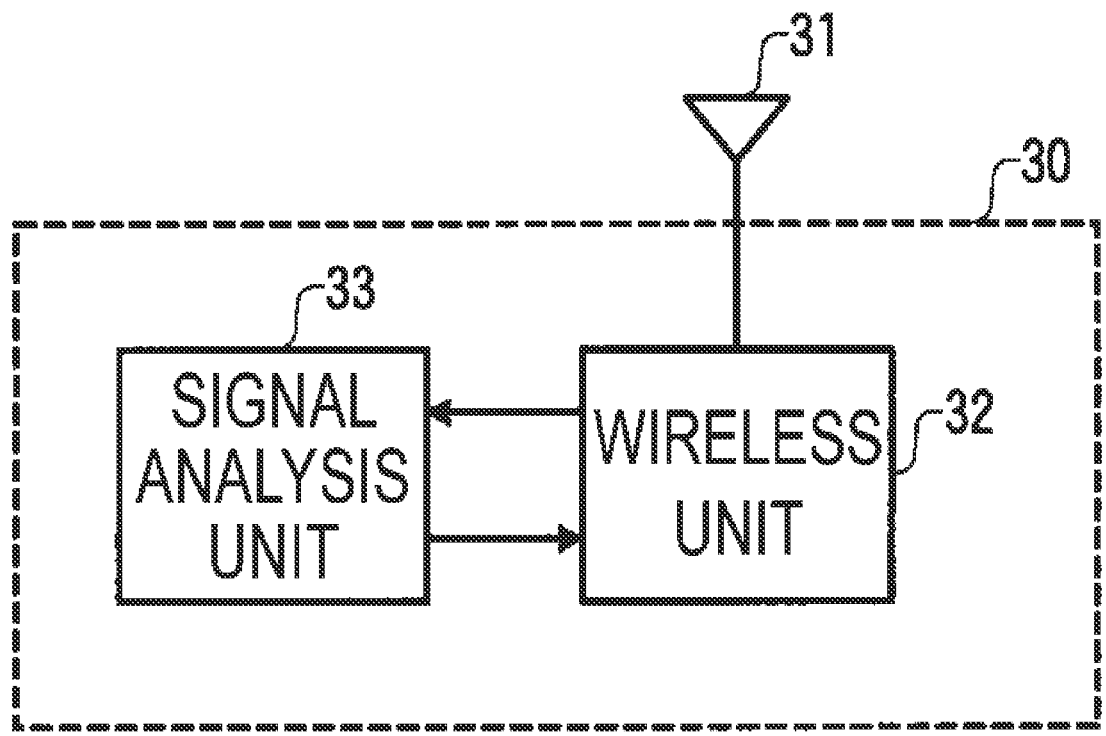
FIG. 3 is a diagram illustrating a configuration example of a relay station 30 of the wireless communication system according to the present invention.

FIG. 3 illustrates a configuration example of each relay station 30 of the wireless communication system according to the present invention.

In FIG. 3, the relay station 30 includes an antenna 31, a wireless unit 32, and a signal analysis unit 33. Note that only blocks related to the present invention are described here, and blocks that are commonly used are omitted.

The signal received by the antenna 31 and the wireless unit 32 from the secondary transmitting station 10 is input to the signal analysis unit 33, and the signal analysis unit 33 analyzes the header information to perform control of turning on/off the relay processing of the relay station 30. Furthermore, when the relay station 30 is turned on, the relay station 30 transmits the signal received from the secondary transmitting station 10 as it is from the wireless unit 32 and the antenna 31. Note that the signal transmitted from the primary transmitting station 40 and received by the relay station 30 is not relayed, regardless of on/off state.

REFERENCE SIGNS LIST

10 Secondary transmitting station
11 Antenna
12 Wireless unit
13 Signal analysis unit
14 Relay station information storage unit
15 Relay station selection and transmission signal generation unit
16 Control signal generation unit
20 Secondary receiving station
30 Relay station
31 Antenna
32 Wireless unit
33 Signal analysis unit
40 Primary transmitting station
50 Primary receiving station

The invention claimed is:

1. A wireless communication system including, a primary transmitting station and a primary receiving station which are being in communication, a secondary transmitting station and one or more secondary receiving stations which use an identical frequency that are used by the primary transmitting station and the primary receiving station, the one or more secondary receiving stations including a secondary receiving station serving as a destination, the secondary receiving station serving as the destination receiving a transmitted signal from the secondary transmitting station, the wireless communication system comprising:

a plurality of relay stations located between the secondary transmitting station and the one or more secondary receiving stations, wherein the secondary transmitting station is configured to execute to:

transmit control signals that cause the signal strengths to be measured at the secondary receiving stations and the primary receiving station for each combination of the one or more relay stations to be turned on:
  store the signal strengths fed back via the relay stations responding to the control signals;
  select at least one relay station that relays the transmitted signal from among the plurality of relay stations based on the signal strengths in accordance with the secondary receiving station serving as the destination;
  add information for turning on the at least one selected relay station to the transmitted signal; and
  transmit the transmitted signal,
the at least one selected relay station is configured to be turned on in accordance with the information of the transmitted signal to perform a non-regenerative relay of the transmitted signal, and
the secondary receiving station serving as the destination is configured to receive the transmitted signal relayed via the at least one relay station that is turned on.

2. The wireless communication system according to claim 1, wherein
the relay station selection unit of the secondary transmitting station is configured to select a combination of at least one of the plurality of relay stations in which a signal strength of the transmitted signal from the secondary transmitting station is a maximum value or is equal to or larger than a predetermined value at the secondary receiving station serving as the destination.

3. The wireless communication system according to claim 1, wherein
the relay station selection unit of the secondary transmitting station is configured to select, from among combinations of at least one of the plurality of relay stations in which a signal strength of the transmitted signal from the secondary transmitting station is smaller than a predetermined value at the primary receiving station, a combination of at least one of the plurality of relay stations in which a signal strength of the transmitted signal from the secondary transmitting station is a maximum value or is equal to or larger than a predetermined value at the secondary receiving station serving as the destination.

4. A wireless communication method in which, a primary transmitting station and a primary receiving station are being in communication, a secondary transmitting station and one or more secondary receiving stations use an identical frequency that are used byprimary tram\nsmitting station and the primary receiving station, the one or more secondary receiving stations include a secondary receiving station serving as a destination, the secondary receiving station serves as a destination receives a transmitted signal from the secondary transmitting station, wherein
a plurality of relay stations are located between the secondary transmitting station and the one or more secondary receiving stations, and
the wireless communication method comprises:
causing the secondary transmitting station to execute to:
  transmit control signals that cause the signal strengths to be measured at the secondary receiving stations and the primary receiving station for each combination of the one or more relay stations to be turned on,
  store the signal strengths fed back from the relay stations responding to the control signals,
  select at least one relay station that relays the transmitted signal from among the plurality of relay stations based on the signal strengths in accordance with the secondary receiving station serving as the destination,
  add information for turning on the at least one selected relay station to the transmitted signal, and
  transmit the transmitted signal,
turning on the at least one selected relay station in accordance with the information of the transmitted signal to perform a non-regenerative relay of the transmitted signal; and
causing the secondary receiving station serving as the destination to receive the transmitted signal relayed via the at least one relay station that is turned on.

5. The wireless communication method according to claim 4, wherein
in the relay station selection processing of the secondary transmitting station, the secondary transmitting station selects a combination of at least one of the plurality of relay stations in which a signal strength of the transmitted signal from the secondary transmitting station is a maximum value or is equal to or larger than a predetermined value at the secondary receiving station serving as the destination.

6. The wireless communication method according to claim 4, wherein
in the relay station selection processing of the secondary transmitting station, the secondary transmitting station selects, from among combinations of at least one of the plurality of relay stations in which a signal strength of the transmitted signal from the secondary transmitting station is smaller than a predetermined value at the primary receiving station, a combination of at least one of the plurality of relay stations in which a signal strength of the transmitted signal from the secondary transmitting station is a maximum value or is equal to or larger than a predetermined value at the secondary receiving station serving as the destination.

* * * * *